US009524347B1

(12) United States Patent
Jung et al.

(10) Patent No.: US 9,524,347 B1
(45) Date of Patent: Dec. 20, 2016

(54) AUTOMATICALLY IMPLEMENTING AN APPLICATION IN RESPONSE TO A SEARCH QUERY

(71) Applicant: Google Inc., Mountain View, CA (US)

(72) Inventors: Chaesang Jung, Palo Alto, CA (US); Jaehyun Yeom, Mountain View, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 14/242,351

(22) Filed: Apr. 1, 2014

(51) Int. Cl.
*G06F 17/30* (2006.01)

(52) U.S. Cl.
CPC ..... *G06F 17/30867* (2013.01); *G06F 17/3053* (2013.01)

(58) Field of Classification Search
CPC ........ H04L 67/10; H04L 67/02; H04L 67/306; H04L 67/1095; G06F 3/04842; G06F 17/30867; G06F 17/30389; G06F 17/30554; G06F 17/017; G06F 17/04817; G06F 17/3053
See application file for complete search history.

(56) References Cited

U.S. PATENT DOCUMENTS

| | | | |
|---|---|---|---|
| 6,418,433 B1 | 7/2002 | Chakrabarti | |
| 6,832,376 B1 | 12/2004 | Sievert | |
| 7,234,139 B1 | 6/2007 | Feinberg | |
| 7,617,225 B2 | 11/2009 | Arrouye | |
| 8,060,487 B2 * | 11/2011 | Schmidt-Karaca | ... G06F 17/301 707/706 |
| 8,086,957 B2 | 12/2011 | Bauchot | |
| 8,433,620 B2 * | 4/2013 | Futty | ................ G06F 17/30867 705/26.1 |
| 8,458,384 B2 | 6/2013 | Johnson | |
| 8,484,636 B2 * | 7/2013 | Mehta | ....................... G06F 8/60 717/176 |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |

(Continued)

FOREIGN PATENT DOCUMENTS

| | | |
|---|---|---|
| EP | 2474905 A2 | 7/2012 |
| EP | 2495670 A1 | 9/2012 |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.
"App Linking," [online][Retrieved on Jan. 7, 2014]; Retrieved from the Internet URL: https://developers.facebook.com/docs/android/link-to-your-native-app/; 14 pages.
"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

(Continued)

*Primary Examiner* — Albert Phillips, III
*Assistant Examiner* — Alp Onat
(74) *Attorney, Agent, or Firm* — Fish & Richardson P.C.

(57) ABSTRACT

Methods, systems, and apparatus, including computer programs encoded on a computer storage medium, for determining when to implement native application that has been identified in response to a search query, the implementation occurring without user intervention. The implementation may involve installing and launching a native application on a user device in response to a query, or launching a native application already installed on a user device in response to the query.

15 Claims, 7 Drawing Sheets

(56) References Cited

U.S. PATENT DOCUMENTS

| | | | | |
|---|---|---|---|---|
| 8,660,849 | B2* | 2/2014 | Gruber | G06F 17/3087 340/988 |
| 8,688,726 | B2* | 4/2014 | Mahajan | G06F 17/3087 455/456.1 |
| 8,874,569 | B2* | 10/2014 | Miller | G06F 17/30696 345/467 |
| 9,043,333 | B1* | 5/2015 | Look | G06F 17/2235 707/744 |
| 9,104,787 | B2* | 8/2015 | Kumar | G06F 17/30867 |
| 9,251,224 | B2* | 2/2016 | Imaizumi | G06F 17/30554 |
| 2002/0144003 | A1 | 10/2002 | Jin | |
| 2004/0030882 | A1 | 2/2004 | Forman | |
| 2007/0209080 | A1 | 9/2007 | Ture | |
| 2010/0257466 | A1 | 10/2010 | Wroblewski | |
| 2010/0306191 | A1 | 12/2010 | LeBeau | |
| 2011/0252038 | A1 | 10/2011 | Schmidt | |
| 2011/0276568 | A1* | 11/2011 | Fotev | G06F 17/30864 707/728 |
| 2011/0314004 | A1 | 12/2011 | Mehta | |
| 2012/0016678 | A1* | 1/2012 | Gruber | G06F 17/3087 704/275 |
| 2012/0124061 | A1 | 5/2012 | Macbeth | |
| 2012/0144281 | A1 | 6/2012 | Schechter | |
| 2012/0179706 | A1 | 7/2012 | Hobbs | |
| 2012/0179955 | A1 | 7/2012 | French | |
| 2012/0284247 | A1* | 11/2012 | Jiang | G06F 17/30867 707/706 |
| 2012/0284256 | A1* | 11/2012 | Mahajan | G06F 17/3087 707/722 |
| 2012/0290584 | A1 | 11/2012 | De Bona et al. | |
| 2012/0291022 | A1* | 11/2012 | Mehta | G06F 8/60 717/176 |
| 2012/0316955 | A1 | 12/2012 | Panguluri | |
| 2012/0323898 | A1 | 12/2012 | Kumar | |
| 2013/0006897 | A1 | 1/2013 | Jain | |
| 2013/0110815 | A1 | 5/2013 | Tankovich | |
| 2013/0111328 | A1 | 5/2013 | Khanna | |
| 2013/0122861 | A1 | 5/2013 | Kim | |
| 2013/0124606 | A1 | 5/2013 | Carpenter | |
| 2013/0191360 | A1 | 7/2013 | Burkard | |
| 2013/0232256 | A1 | 9/2013 | Lee | |
| 2013/0268397 | A1* | 10/2013 | Mehta | G06F 8/60 705/26.7 |
| 2013/0283285 | A1 | 10/2013 | Zhou | |
| 2013/0298007 | A1 | 11/2013 | Cullen | |
| 2013/0325856 | A1 | 12/2013 | Soto | |
| 2014/0136691 | A1 | 5/2014 | Crosby | |
| 2014/0188897 | A1* | 7/2014 | Baker | G06Q 30/0631 707/748 |
| 2014/0245141 | A1* | 8/2014 | Yeh | G06F 3/0481 715/708 |
| 2014/0359598 | A1* | 12/2014 | Oliver | G06F 8/61 717/174 |
| 2015/0006328 | A1* | 1/2015 | Yoon | G06Q 30/0629 705/26.64 |
| 2015/0038161 | A1* | 2/2015 | Jakobson | H04W 4/02 455/456.1 |

OTHER PUBLICATIONS

"Deeplink.me Lets Mobile Users Navigate Through a "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

Frequently Asked Questions—General Information, [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, a New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Goggle+ from your Android app," [online][Retrieved on Jan. 7, 2014]; Retrieved from the Internet URL: https://developers.google.com/+/mobile/android/share/#handling_incoming_deep_links; 2 pages.

* cited by examiner

AUTOMATICALLY IMPLEMENTING AN APPLICATION IN RESPONSE TO A SEARCH QUERY

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. With the advent of tablet computers and smart phones, native applications that facilitate the performance of the same functions facilitated by the use of web page resources are now being provided in large numbers.

Additionally, native applications that do not have websites with synchronous content, such as games, are also very popular on tablet computers and smart phones. Many of these latter types of native applications also have web pages that are descriptive of the native application, such as a product page that can be browsed using a web browser. The product page may include screen shots of the native application, user ratings, and the like.

Search engines now also facilitate searching of these native applications. A user's informational need may thus be satisfied by providing search results that identify either one (or both) of a particular web page resource that describes a native application, and search results for the native application itself.

Furthermore, search engine interfaces are becoming more sophisticated, resulting in increasing functionality. Some search engines, for example, process voice commands (or text commands) and may, in response, instruct the user device to take an action in response to the command.

SUMMARY

This specification describes technologies relating to automatically launching an application in response to a search query.

In general, one innovative aspect of the subject matter described in this specification can be embodied in methods that include the actions of receiving queries, each query received from a corresponding user device, and for each query: receive data indicating resources and native applications identified by a search operation as being responsive to the query, each resource and native application having a corresponding search score by which the resources and native applications are ranked in responsiveness to the query relative to other resources and native applications, and determining whether the query has a focus intent on one or more native applications; for only each query determined to have a focus intent on one or more of the native applications, determining, based on the corresponding search scores of the identified resources and native applications, whether one of the one or more native applications for which the query has the focus intent is to be launched at the user device from which the query was received; for only each query for which one of the one or more native applications for which the query has a focus intent is to be launched, providing a first instruction to the user device that causes the native application to be launched without user intervention. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The automatic launching of an application in response to a search query facilitates an intuitive user experience that satisfies a user's need without the need of additional user intervention. Automatic launching is conditioned on several factors that reduce the likelihood of launching an application when a user does not, in fact, desire the application to be launched. Furthermore, the determination to automatically launch an application may be based, in part, on user feedback from one or more users. The consideration of a user behavior model increases the likelihood that applications will launch only when users desire such launches as compared to launch determinations that do not take into account such user feedback. The automatic launching enables touchless control to open an application with increased user velocity, thus improves accessibility for persons with either temporary or physical impairments.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
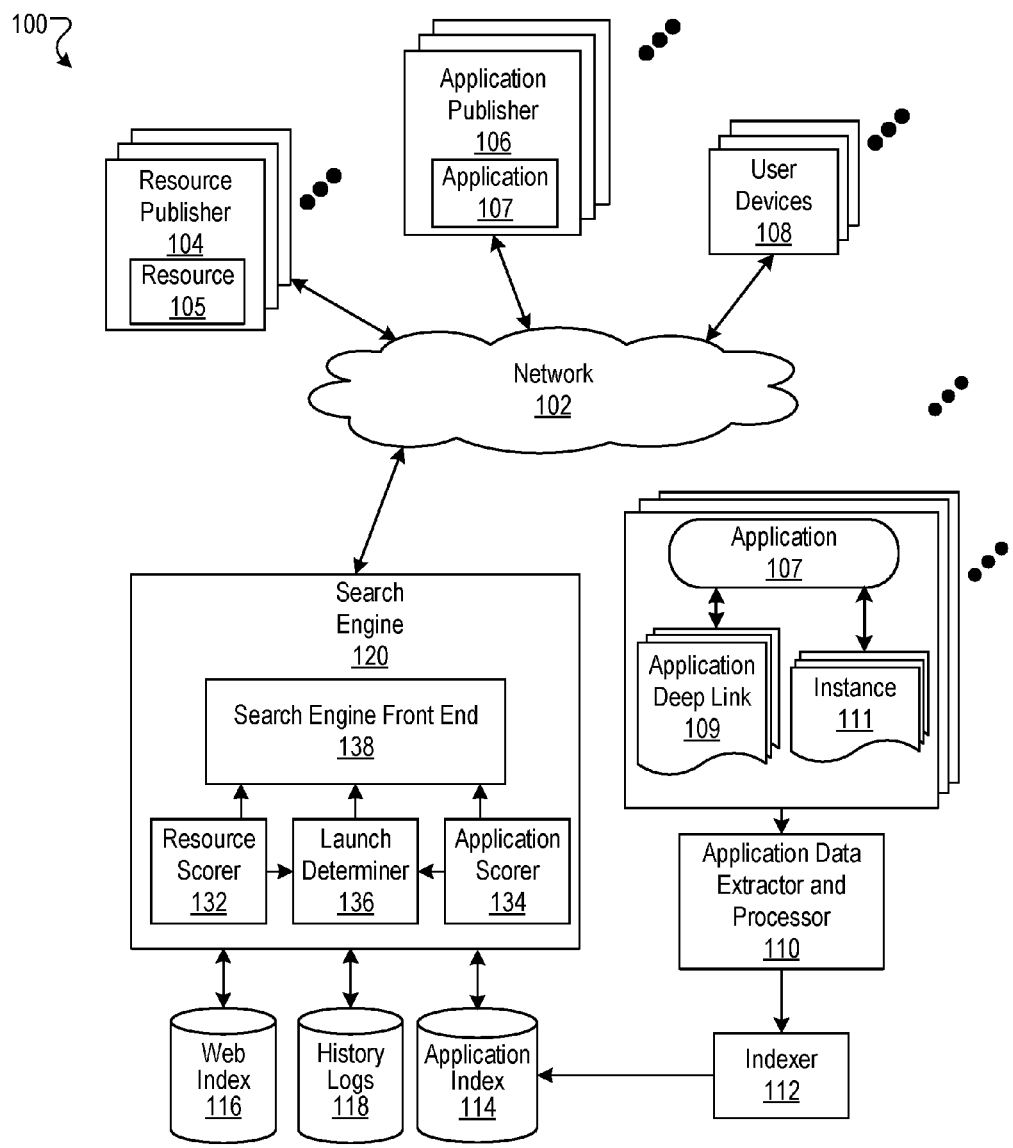
FIG. 1 is a block diagram of an example environment in which queries are processed to determine whether to automatically launch an application.

A system determines whether to implement a native application on a user device in response to a query. As used herein, "implementing a native application on a user device" means to install and launch a native application on a user device in response to a query, or to launch a native application already installed on a user device in response to the query. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

In some implementations, the search system receives the query and data indicating resources and native applications identified by a search operation as being responsive to the query. Each resource and native application has a corresponding search score by which the resources and native applications are ranked in responsiveness to the query relative to other resources and native applications.

Based on the nature of the query and the scoring of the resources and the native applications, the search system determines whether the native application should be launched at the user device. The search system, for example, determines if the query is informational, or otherwise indicative of a user desiring a broad information search. If so, the search system determines that the native application should not be launched at the user device.

However, if the nature of the query is indicative of a user having a focus intent on a native application, the system then determines whether one of the one or more native applications is to be launched based on the search score of the resources and the native application. A focus intent is a signal that a user may have a very high level of interest in a native application. For example, a focus intent may occur when terms of the query match a native application name of one of the native applications identified by the search operation. Other criteria for determining a focus intent can also be used.

Various criteria can also be applied to determine whether an application should launch. For example, a native application may be required to be a top ranked search result to be eligible for an automatic launch. Furthermore, the native application may be required to have a score that exceeds the score of other native applications by a threshold differential. Additionally, a launch preference derived from user feedback may be determined for the native application. The launch preference may be used to adjust thresholds for determining whether to launch the native application, or may be used as a separate threshold check.

If the search system determines the native application is to be launched, the search system provides an instruction to the user device that causes the native application to be launched without user intervention. The search system may also provide search results that identify the resources and the native applications so that the search results are presented when the user closes the native application.

These features and other features are described in more detail below.

FIG. 1 is a block diagram of an example environment 100 in which triggering the search of and the ranking of native applications occurs. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 116 and an application index 114. The web index 116 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 116 and, optionally, the application index 114 to identify resources and applications, respectively, that are relevant to the query. Generally, a first type of search operation implementing a first search algorithm is used to search the index 116, and a second type of search operation implementing a second, different algorithm is used to search the application index 114. The search engine 120 implements a resource scorer 132 process to score web resources, and an application scorer 134 process to score native applications. A variety of appropriate search engine algorithms can be used to implement the resource scorer 132 and the application scorer 134. The resulting search scores for resources and applications are normalized with respect to each other so that the resources and native applications may be ranked relative to each other according to their respective relevance to the query.

A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114. A native application search result may include a "deep link" specifying a particular environment instance 111 of the native application and which is configured to cause the native application to instantiate the specified environmental instance. For example, selection of a native application search result may cause the native application to launch (if installed on the user device 108) and generate an environment instance referenced in the application search result in the form of a screen shot. Alternatively, a native application search result may include a "purchase" (or "install") command that, when selected, results in a purchase (or free download) and installation of the native application on a user device.

Publishers 106 that provide native applications 107 also provide the deep links 109 to the search engine 120. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

The queries submitted from user devices 108, and selection data for the queries and the search results selected by users may be stored in history logs 118. The search engine 120 may access the history logs 118 to map queries submitted by user devices to resources that were identified in search results and the actions taken by users when presented with the search results in response to the queries. The selection logs 118 can thus be used by the search engine to determine the respective sequences of queries submitted by the user devices, the device types that submitted the queries, and the actions taken in response to the queries.

As will be described in more detail below, a launch determiner 136 determines whether to launch a native application installed on a user device in response to a query. The determination may be based on the type of query received, the relevance of the native applications to the search query, and, optionally, behavioral feedback. For the latter, for example, data that indicates whether launches were short launches may be stored in the history logs 118. A short launch of a native application occurs when a native application is closed after launching within a predefined period of time that is indicative of a user not desiring a launching of the native application. For example, if an application is closed within N seconds, e.g., 10 seconds, of an automatic launching in response to a search query, data indicating a short launch for the application and the query are sent back to search engine 120 and stored in the history logs 118. Generally, the higher the short launch rate, the less likely the launch determiner 136 will determine that a native application should be launched automatically.

Figure 2:
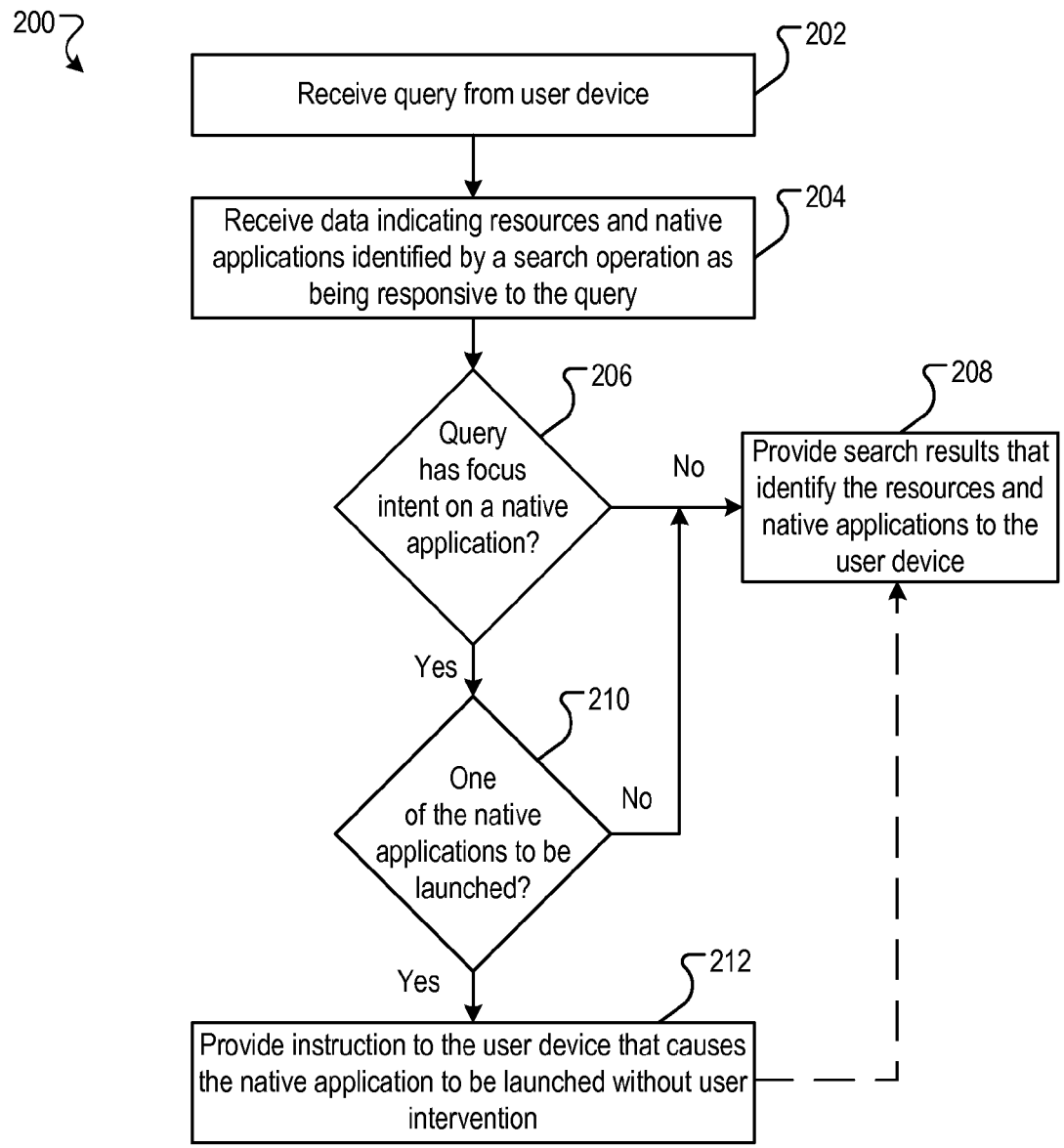
FIG. 2 is a flow diagram of an example process for determining whether to launch an application in response to a query.

FIG. 2 is a flow diagram of an example process 200 for determining whether to launch an application in response to a query. The process 200 can be implemented in a data processing apparatus of one or more computers that are in data communication and that are used to realize the launch determiner 136. The process 200 may be done for each query received at the search engine 120.

The process 200 receives a query from a user device (202). The query is one or more terms. The process 200 may also receive additional information with the query, such as information describing what native applications are installed on the user device. This information may be included with the query, or may be stored in account data that is resolved to the user device that submitted the query. Knowledge of native applications installed on the user device can be used to determine whether to launch a native application, as will be described in more detail below. However, the information describing what native applications are installed on the user device is not necessary for the process 200.

The process 200 receives data indicating resources and native applications identified by a search operation as being responsive to the query (204). For example, the process 200 receives information from the search engine indicating resources and native applications identified by a search operation as being responsive to the query. In some implementations, the query is one or more terms that do not constitute an explicit launch command for a native application. Each resource and native application has a corresponding search score by which the resources and native applications are ranked in responsiveness to the query relative to other resources and native applications. For example, the launch determiner 136 receives this information from the scorers 132 and 134.

The process 200 determines whether the query has a focus intent on a native application (206). A query may have a focus intent when the query is not an informational query, and indicate that a user may have a strong interest in a native application. For example, a navigational query may have a focus intent on a native application. A navigational query is a query for which there is typically one highly relevant result. To illustrate, assume a native application title is "Best Chess." The query [best chess] may be navigational in the context of a native application as it is indicative of one application result that is highly satisfactory of a user's informational need.

Conversely, if a query is "informational," meaning there are multiple results that are highly responsive to the query, then the query may not have a focus intent. For example, instead of the query [best chess], assume a user inputs the query [chess applications]. Such a query is a categorical query directed to chess applications. The application results may be so varied that one native application search result will be unlikely to satisfy the user's informational need, as the user's informational need is not clear. For example, the user may desire a chess game, or a chess application that provides opening books, or may just be curious as to how many chess applications are available. Similar queries that are informational, such as "free games," or "new reader apps," etc., would not be determined to have a focus intent.

In some implementations, a query has a focus intent on a native application when the query refers to a name of one or more of the native applications identified by the search operation. A focus intent may be determined when the query includes terms that exactly match terms of the name of one or more native applications identified in response to the search query. For example, the query [Best Chess app] may have a focus intent for the application "Best Chess" if the native application is identified in the search. Furthermore, in variations of these implementations, the focus intent can also be detected from terms that precede or follow the name of the native application. For example, for the query [Best Chess app], the term "app" may further strengthen the determination of a focus intent for the "Best Chess" application. Likewise, the query [launch Best Chess] may further strengthen the determination of a focus intent for the "Best Chess" application.

In other implementations, a focus intent may be limited to queries that exactly match an application title. For example, the query [Best Chess] would be determined to have a focus intent on the application "Best Chess," but the query [Best Chess app] would not.

Additionally, if a native application for which the query could have a focus intent is not installed on the user device, then the launch determiner 136 will determine that the query does not have a focus intent. This decision can be made when knowledge of the native applications installed on the user device is available.

Other ways of determining a focus intent can also be implemented.

If the process 200 determines that the query does not have a focus intent on a native application that is identified by the search operation, then the process 200 provides search results that identify the resources and the native applications to the user device (208). For example, the search engine front end 138 will generate search results and provide the search results to the user device.

If, however, the process 200 does determine that the query has a focus intent on a native application, then the process 200 determines whether one of the native applications is to be launched (210). There are a variety of factors that may be considered when determining to launch a native application. These factors include relevance of the native application to the query relative to other resources and native applications, and, optionally, behavioral feedback from users. The process of determining whether one of the native applications is to be launched is described in more detail with reference to FIG. 3 below.

If the process 200 determines that none of the native applications are to be launched, then the process 200 provides search results that identify the resources and the native applications to the user device (208). If, however, the process 200 determines that one of the native applications is to be launched, then the process 200 provides an instruction to the user device that causes the native application to be launched without user intervention (212). The instruction may be, for example, provided by means of an API to a browser or some other application on the user device, and the instruction may specify that the user device is to launch the particular native application that was determined to be launched. Other ways of providing the instruction can also be used, such as passing the instruction as a special token in a response URL, etc.

The instruction can be processed so that in the event the native application is not installed on the user device, no operation is performed. This is useful when the launch determiner 136 does not have access to a list of native applications installed on the user device.

In some implementations, the launch determiner may also provide search results that with the instruction to launch a native application, also provide a second instruction that causes the user device to display the search results in response to a user closing the native application (or in response to the launch instruction to launch a particular native application being provided when the particular native application is not installed on the user device). Thus, in the event the user does not desire to have the native application launched, the user may exit the native application and be presented with the search results responsive to the user's query. In some implementations, the instructions may cause the user device to display the search results only when the launch of the native application results in a short launch.

Figure 3:
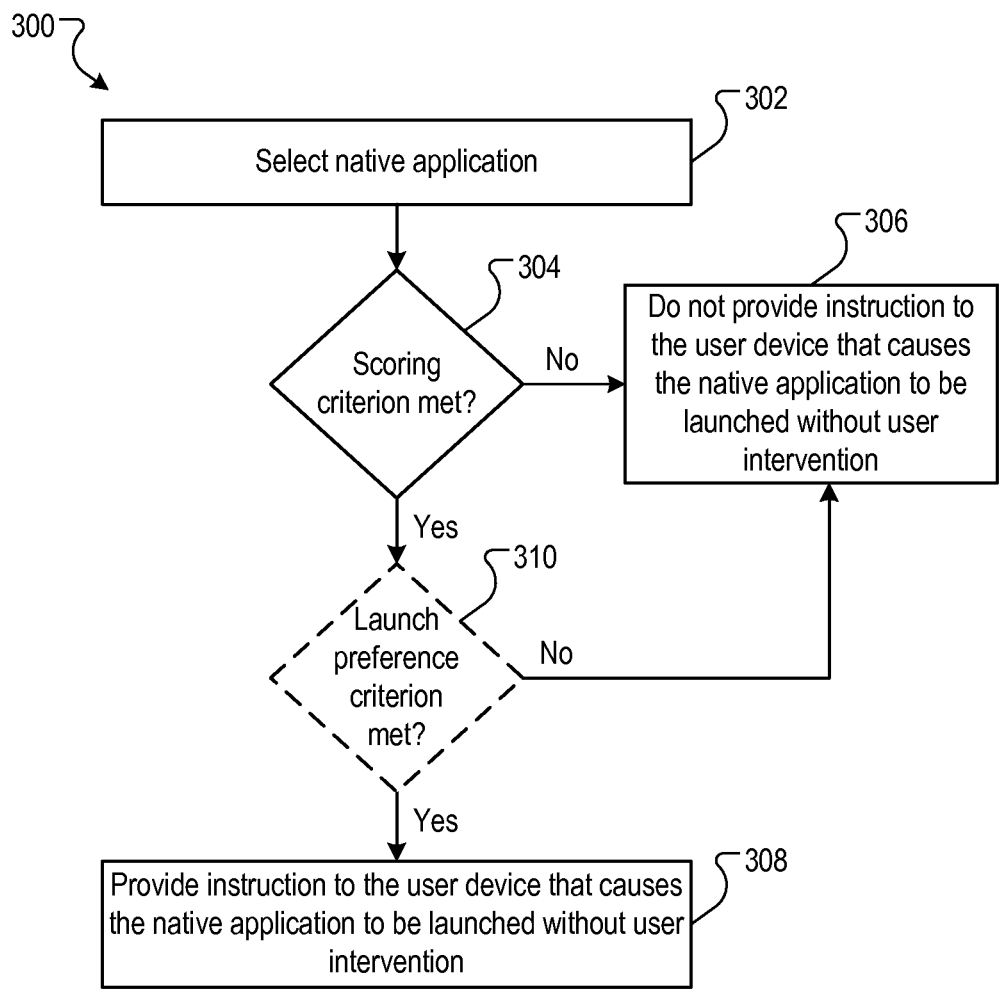
FIG. 3 is a flow diagram of an example process for determining whether an application is to be launched in response to a query having a focus intent on the native application.

FIG. 3 is a flow diagram of an example process 300 for determining whether an application is to be launched in response to a query having a focus intent on the native application. The process 300 can be implemented in a data processing apparatus of one or more computers that are in data communication and that are used to realize the launch determiner 136.

The process 300 selects a native application for which a query has a focus intent (302). For example, a native application with an application name that matches the query text may be selected.

The process 300 determines if a scoring criterion is met (304). The process 300 may consider only one criterion, or may consider multiple criteria.

One example criterion is relevance. For example, the native application to which the query refers may be required to be ranked first (or within the top N positions) relative to the resources and other native applications identified by the search operation. If this criterion is satisfied, a launch instruction may be generated.

Another criterion is that the native application must be ranked first relative to other native application, and must have a search score that exceeds the search score of a second ranked native application by a threshold difference. For example, two closely ranked native applications, e.g., "Best Chess" and "Best Chess Openings," may be closely ranked for a query, e.g., "Best Chess," that the launch determiner 136 will not provide a launch instruction for either application.

If, however, the process 300 does determine the scoring criterion is met, then the process 300 provides the instruction to the user device that causes the native application to be launched without user intervention (308). However, in some implementations, user feedback may be incorporated into the launch determination, as indicated by the optional step 310, in which the process 300 determines if a launch preference criterion is met. The process 300 determines a launch preference and compares it to the launch preference criterion. The launch preference is based on a number of short launches of the native application relative to a number of total launches of the native application. A short launch of a native application occurs when a native application is closed after launching within the predefined period of time that is indicative of a user not desiring a launching of the native application. The number of total launches of the native application is the number of launches of the native application in response to search queries and without user intervention.

If the process determines the launch preference criterion is not met, e.g., the launch preference is a short launch rate that is greater than the maximum short launch rate, then the process does not provide the instruction that causes the native application to be launched without user intervention (306). If, however, the process does determine the launch preference criterion is met, then the process 300 provides the instruction to the user device that causes the native application to be launched without user intervention (310).

In some implementations, the number of short launches of the native application and the number of total launches of the native application are totaled on a per-query basis (or, alternatively, a per-application basis). The launch preference is based on the number of short launches of the native application and total launches for the native application on the per-query basis (or the per-application basis). Accordingly, different queries and different applications may have different launch preference thresholds. The launch preference may also be user specific, or based on aggregate data from multiple users, or a combination of both.

In some implementations, the launch preference data may be incorporated in the scoring criterion process. Thus, instead of being used in a separate thresholding operation, the launch preference data may be used to adjust the scoring threshold for the scoring criteria.

Figure 4A:
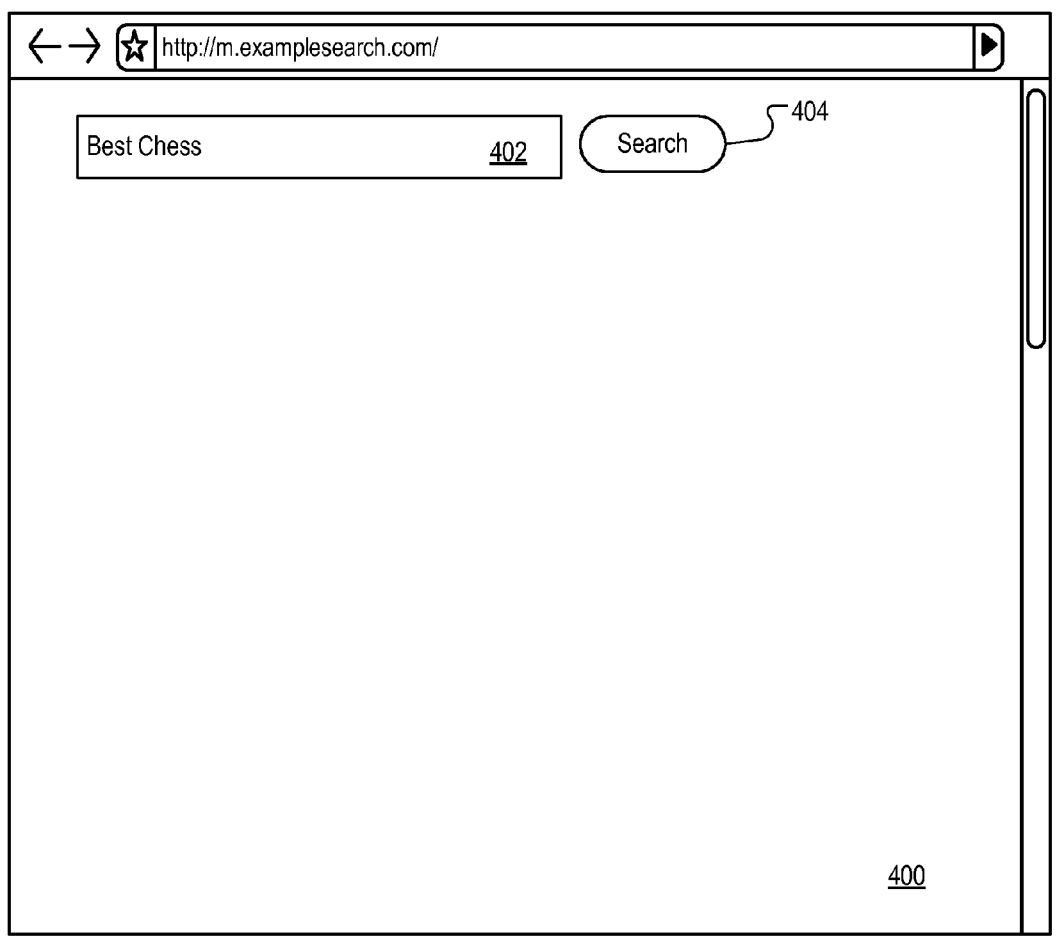
FIG. 4A is an illustration of a search environment in which a query is input by a user.

FIGS. 4A-4D are example illustrations of a user device interface and show various environments resulting from the application of the systems and processes described above. In particular, FIG. 4A is an illustration of a search environment 400 in which a query [Best Chess] is input in an input field 402 by a user. The user selects the search button 404 to submit the query to the search engine.

Figure 4B:
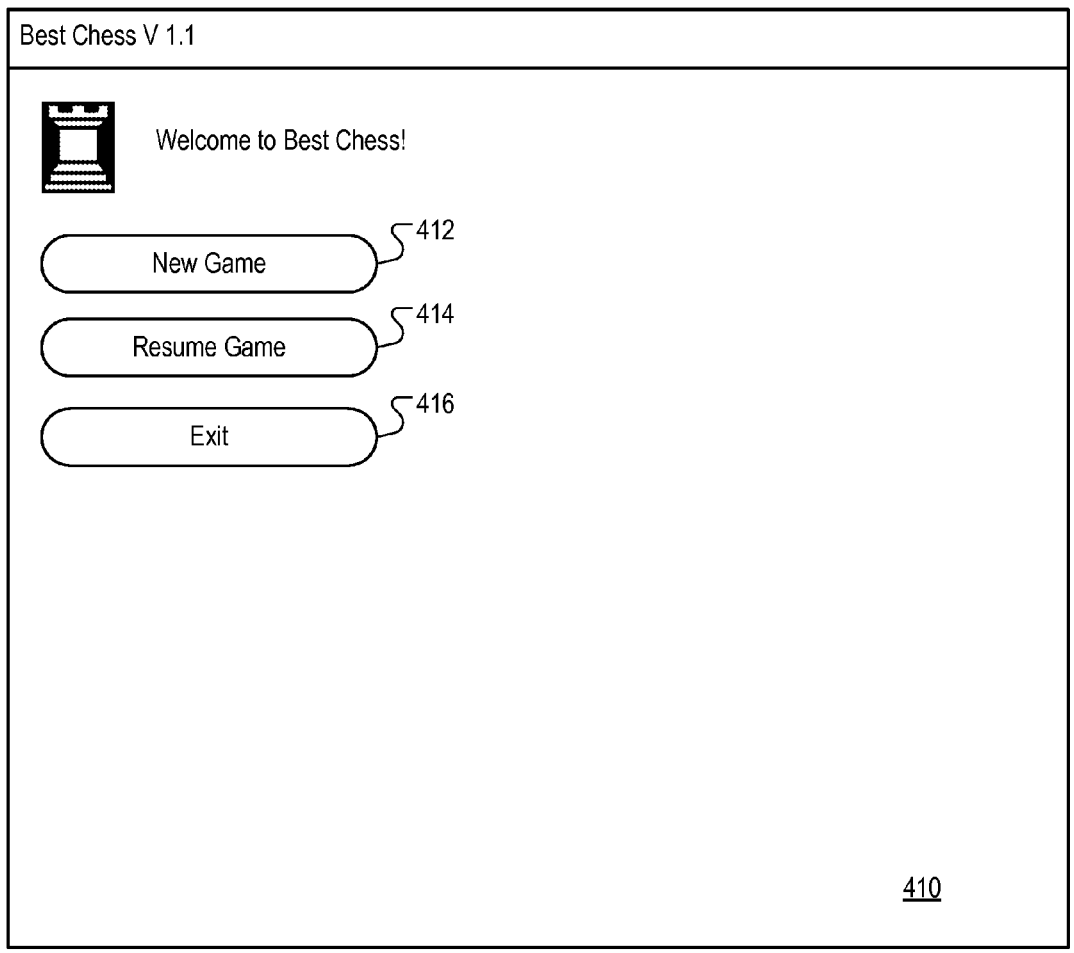
FIG. 4B is an illustration of an application environment of an application launched in response to the query input in FIG. 4A.

FIG. 4B is an illustration of an application environment of an application launched in response to the query input in FIG. 4A. As described in the examples above, the launch determiner 136 provides an instruction to the user device to launch the application "Best Chess" in response to the query [Best Chess]. The environment 410 is a main menu start up, with three options 412, 414 and 416, the latter option being a command button that, when selected, exits the native application.

Figure 4C:
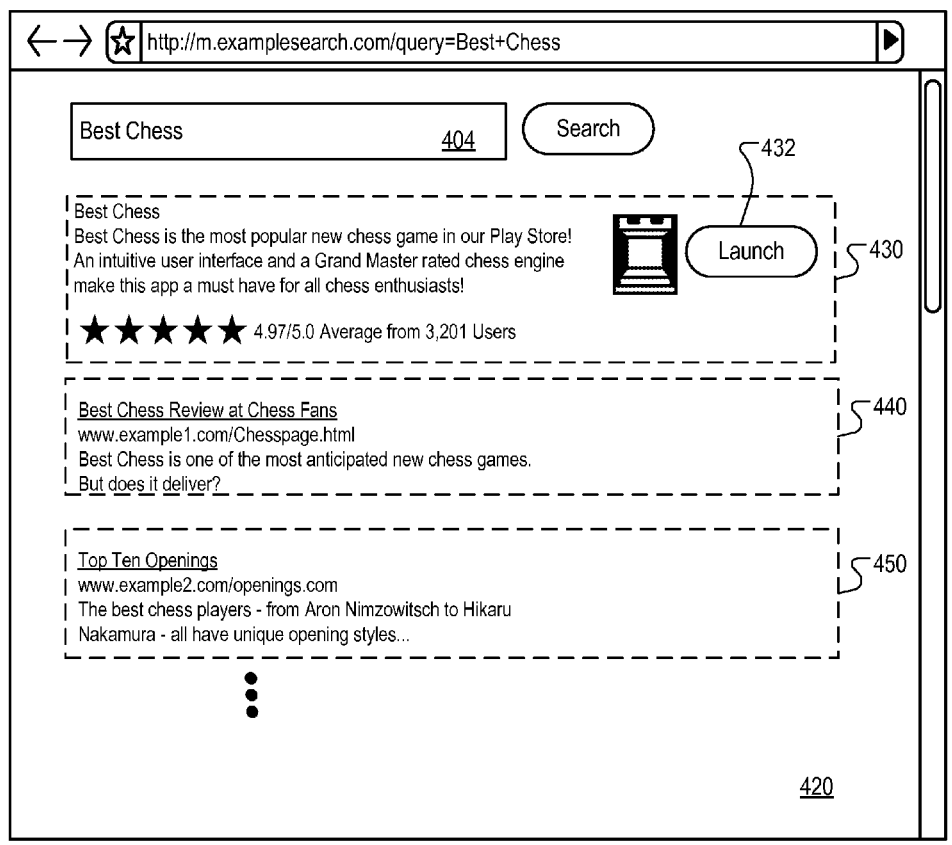
FIG. 4C is an illustration of a search environment that is shown after the application is closed.

FIG. 4C is an illustration of a search environment 420 that is shown after the application is closed. In some implementations, the search environment is shown only if the launch of the native application is a short launch, as the lack of a short launch is a signal that the user was interested in launching the application and not viewing search results. Displayed in the search environment are search results 430, 440 and 450 that are responsive to the query "Best Chess" displayed in the search input field 404. The search result 430 is a native application search result that is generated in response to a search of the application index 114. The search result 4310 may include, for example, a description of the native application, an icon, rating information, and a command 432. Selecting the command 432, or, alternatively, the native application search result, causes the native application to launch.

If the native application "Best Chess" was not installed on the user device, then the "launch" command 432 may be replaced with a "Purchase" command. Selection of the purchase command would initiate an on-line purchasing operation.

The search results 440 and 450 are web search results generated in response to a search of a web index 116 of resources. Each search result 440 and 450 references a resource that can be rendered in a browser application on a user device and includes a link to the resource, and other data, such as a snippet of text extracted for the referenced resource.

Figure 4D:
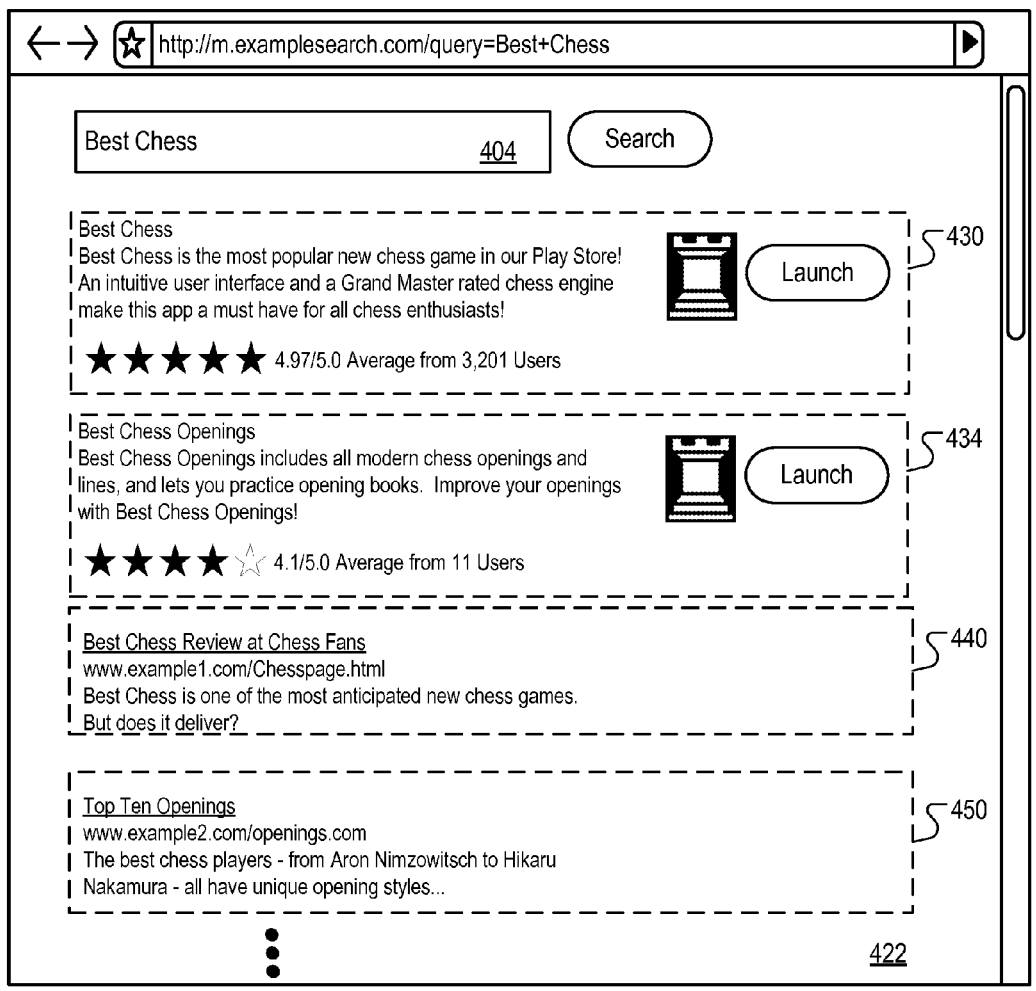
FIG. 4D is an illustration of a search environment and for which the same query of FIG. 4A does not result in the launching of an application.

FIG. 4D is an illustration of a search environment 422 and for which the same query of FIG. 4A does not result in the launching of an application. The environment 422 is similar to the environment 420, except for the additional native application search result 434. For example, assume a new native application "Best Chess Openings" was recently released and thus identified by the search operation. Also assume that the search scores for the two applications "Best Chess" and "Best Chess Openings" are sufficiently close so that the scoring criterion to automatically launch an application is not met. In this case, neither application is launched, and the search environment 422 is shown in response to the query.

The examples above are directed to automatically launching an application. However, as described above, the system may also implement the native application by automatically installing and launching the native application in response to the query. The same criteria that are used to determine whether to launch an installed native application can also be used to determine whether to install and then launch the native application. In some implementations, the thresholds for determining whether to install and then launch the native application may be higher than when determining whether to launch an installed native application, as the process of installing a native application requires more resources and time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   receiving queries, each query received from a corresponding user device;
   for each query:

receive data indicating resources and native applications identified by a search operation as being responsive to the query, each resource and native application having a corresponding search score by which the resources and native applications are ranked in responsiveness to the query relative to other resources and native applications;

determining whether the query has a focus intent on one or more native applications;

for only each query determined to have a focus intent on one or more of the native applications, determining, based on the corresponding search scores of the identified resources and native applications, whether one of the one or more native applications for which the query has the focus intent is to be implemented at the user device from which the query was received, the determining comprising:

determining that the one of the one or more native applications for which the query has a focus intent is not to be implemented only when the one of the one or more native applications is ranked first relative to the resources and other native applications identified by the search operation and has a search score that does not exceed, by a threshold difference, a search score of a second native application ranked second among native applications relative to the one of the one or more native applications ranked first;

for only each query for which one of the one or more native applications for which the query has a focus intent is to be implemented, providing a first instruction to the user device that causes the native application to be implemented without user intervention;

for each other query for which none of the native applications for which the query has a focus intent is to be implemented, providing search results that identify the resources and the native applications to the user device.

2. The computer-implemented method of claim 1, wherein determining whether one of the one or more native applications for which the query has the focus intent is to be implemented comprises determining whether one of the one or more native applications installed on the user device is to be launched.

3. The computer-implemented method of claim 2, wherein determining whether the query has a focus intent on one or more native applications comprises determining that the query has a focus intent on one or more of the native applications when the query refers to a name of one or more of the native applications identified by the search operation.

4. The computer-implemented method of claim 3, wherein determining whether the query refers to a name of one or more of the native applications identified by the search operation comprises determining the query includes terms that exactly match terms of the name of one or more native applications.

5. The computer-implemented method of claim 4, wherein determining the query includes terms that exactly match terms of the name of one or more native applications comprises determining that each term of the query exactly matches a term of the name of one or more native applications.

6. The computer-implemented method of claim 2, wherein determining whether one of the one or more native applications for which the query has a focus intent is to be launched at the user device from which the query was received further comprises:

determining, based on user interactions with search results for prior queries for which the one of the one or more native applications was identified, a launch preference for the native application.

7. The computer-implemented method of claim 6, wherein the launch preference is based on a number of short launches of the native application relative to a number of total launches of the native application, where a short launch of a native application occurs when a native application is closed after launching within a predefined period of time that is indicative of a user not desiring a launching of the native application, and the number of total launches of the native application is the number of launches of the native application in response to search queries and without user intervention.

8. The computer-implemented method of claim 7, wherein the number of short launches of the native application and the number of total launches of the native application are based on launches of the native application for a plurality of users.

9. The computer-implemented method of claim 7, wherein the number of short launches of the native application and the number of total launches of the native application are totaled on a per-query basis, and the launch preference is based on the number of short launches of the native application and total launches for the native application on the per-query basis.

10. The method of claim 1, wherein:

providing the first instruction to the user device that causes the native application to be implemented without user intervention comprises providing an instruction to the user device that causes the native application to be launched without user intervention;

and the method further comprises:

providing search results that identify the resources and the native applications to the user device; and providing a second instruction to the user device that causes the user device to display the search results in response to a user closing the native application after the native application has in response to the user device processing the first instruction, launched without user intervention.

11. The computer-implemented method of claim 10, where the second instruction to the user device that causes the user device to display the search results in response to a user closing the native application is an instruction that causes the user device to display the search results in response to a short launch, the short launch occurring when a native application is closed after launching within a predefined period of time that is indicative of a user not desiring a launching of the native application.

12. A system, comprising:

a data processing apparatus comprising one or more processing devices; and a non-transitory computer readable storage medium storing instructions executable by the data processing apparatus and that upon such execution cause the data processing apparatus to perform operations comprising:

receiving queries, each query received from a corresponding user device;

for each query:

receive data indicating resources and native applications identified by a search operation as being responsive to the query, each resource and native application having a corresponding search score by which the resources and native applications are ranked in responsiveness to the query relative to other resources and native applications;

determining whether the query has a focus intent on one or more native applications;

for only each query determined to have a focus intent on one or more of the native applications, determining, based on the corresponding search scores of the identified resources and native applications, whether one of the one or more native applications for which the query has the focus intent is to be launched at the user device from which the query was received the determining comprising:

determining that the one of the one or more native applications for which the query has a focus intent is not to be implemented only when the one of the one or more native applications is ranked first relative to the resources and other native applications identified by the search operation and has a search score that does not exceed, by a threshold difference, a search score of a second native application ranked second among native applications relative to the one of the one or more native applications ranked first;

for only each query for which one of the one or more native applications for which the query has a focus intent is to be launched, providing a first instruction to the user device that causes the native application to be launched without user intervention; and for each other query for which none of the native applications are determined to be launched, providing search results that identify the resources and the native applications to the user device.

13. The system of claim 12, wherein determining whether the query has a focus intent on one or more native applications comprises determining that the query has a focus intent on one or more of the native applications when the query refers to a name of one or more of the native applications identified by the search operation.

14. The system of claim 12, wherein determining whether one of the one or more native applications for which the query has a focus intent is to be launched at the user device from which the query was received further comprises:

determining, based on user interactions with search results for prior queries for which the one of the one or more native applications was identified, a launch preference for the native application, and wherein the launch preference is based on a number of short launches of the native application relative to a number of total launches of the native application, where a short launch of a native application occurs when a native application is closed after launching within a predefined period of time that is indicative of a user not desiring a launching of the native application, and the number of total launches of the native application is the number of launches of the native application in response to search queries and without user intervention.

15. A non-transitory computer readable storage medium storing instructions executable by a data processing apparatus and that upon such execution cause the data processing apparatus to perform operations comprising:

receiving queries, each query received from a corresponding user device;

for each query:

receive data indicating resources and native applications identified by a search operation as being responsive to the query, each resource and native application having a corresponding search score by which the resources and native applications are ranked in responsiveness to the query relative to other resources and native applications;

determining whether the query has a focus intent on one or more native applications;

for only each query determined to have a focus intent on one or more of the native applications, determining, based on the corresponding search scores of the identified resources and native applications, whether one of the one or more native applications for which the query has the focus intent is to be launched at the user device from which the query was received, the determining comprising:

determining that the one of the one or more native applications for which the query has a focus intent is not to be implemented only when the one of the one or more native applications is ranked first relative to the resources and other native applications identified by the search operation and has a search score that does not exceed, by a threshold difference, a search score of a second native application ranked second among native applications relative to the one of the one or more native applications ranked first;

for only each query for which one of the one or more native applications for which the query has a focus intent is to be launched, providing a first instruction to the user device that causes the native application to be launched without user intervention; and for each other query for which none of the native applications are determined to be launched, providing search results that identify the resources and the native applications to the user device.

* * * * *